Aug. 19, 1941.   C. L. EKSERGIAN ET AL   2,253,268
BRAKE MECHANISM
Filed March 1, 1940   2 Sheets-Sheet 2
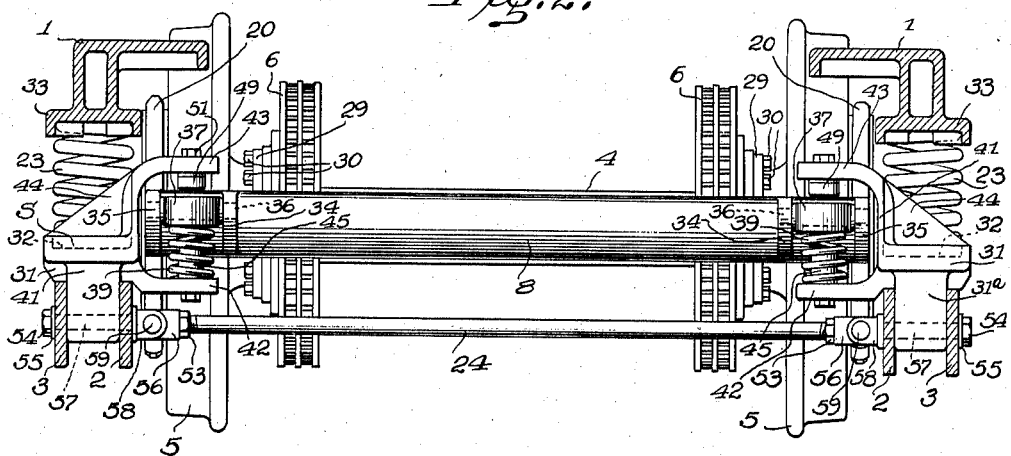
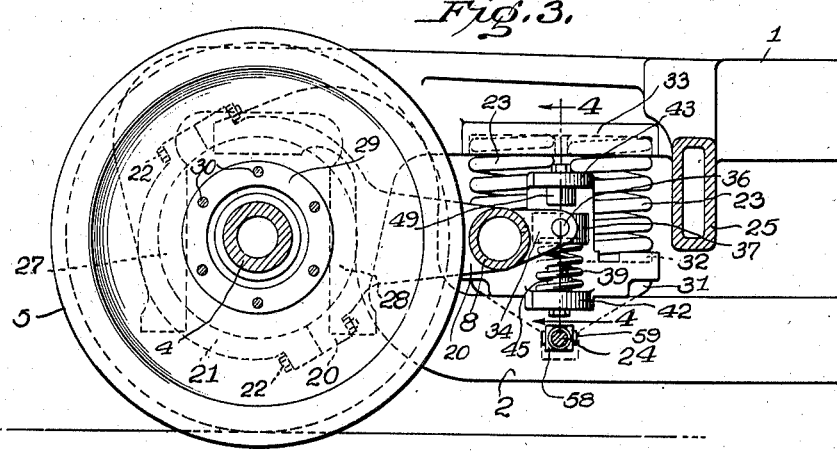
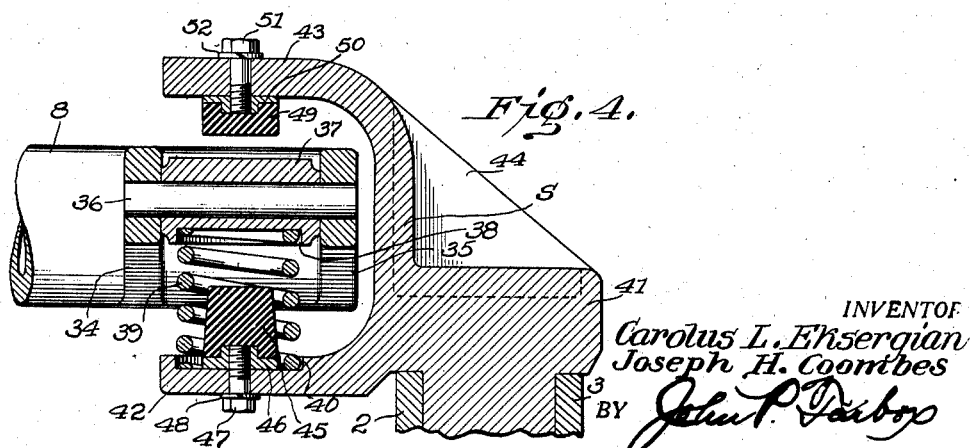
INVENTOR
Carolus L. Eksergian
Joseph H. Coombes
BY
ATTORNEY Patented Aug. 19, 1941

2,253,268

UNITED STATES PATENT OFFICE 2,253,268

BRAKE MECHANISM

Carolus L. Eksergian and Joseph H. Coombes, Detroit, Mich., assignors to Budd Wheel Company, Philadelphia, Pa., a corporation of Pennsylvania Application March 1, 1940, Serial No. 321,688

13 Claims. (Cl. 188—59)

The present invention relates to brakes.

More specifically, the invention relates to supporting the weight of the frame carrying one part of the brake mechanism by a relatively weak or low rate resilient means, having sufficient resistance to support said weight when the brake is not acting, but insufficient to overcome the thrust produced during braking.

The invention, which is particularly applicable to brakes of the so-called disk type, wherein the brake cylinders and brake shoes are carried by a yoke or C-frame, further contemplates providing relatively strong or high rate resilient means, such as stiff bumpers for example, to cooperate with the frame so that they will carry the thrust during the braking periods.

In a preferred form of the invention, low-rate helical springs accomplish the first function, while solid rubber buffers assume the thrust of braking, both the helical springs and the buffers being carried by the equalizer bars, which afford a steadier support than would the truck frame itself, as heretofore often used.

Other objects and features of the invention will be evident from the present specification descriptive of a preferred embodiment of the same, and the drawings accompanying it and forming a part thereof.

In said drawings:

Fig. 2 is a sectional elevation corresponding to Fig. 1, the section being made on the plane indicated by the line 2—2 thereof, the brake cylinders and certain parts operated thereby being omitted;

Fig. 3 is a fragmentary section on the planes indicated by the broken line 3—3 of Fig. 1; and Fig. 4 is a partly sectional fragmentary detail showing the stop mechanism, the section being made on the plane indicated by the line 4—4 of Fig. 3, and on a very much larger scale.

In all the figures, similar elements are designated by the same reference characters.

Figure 1:
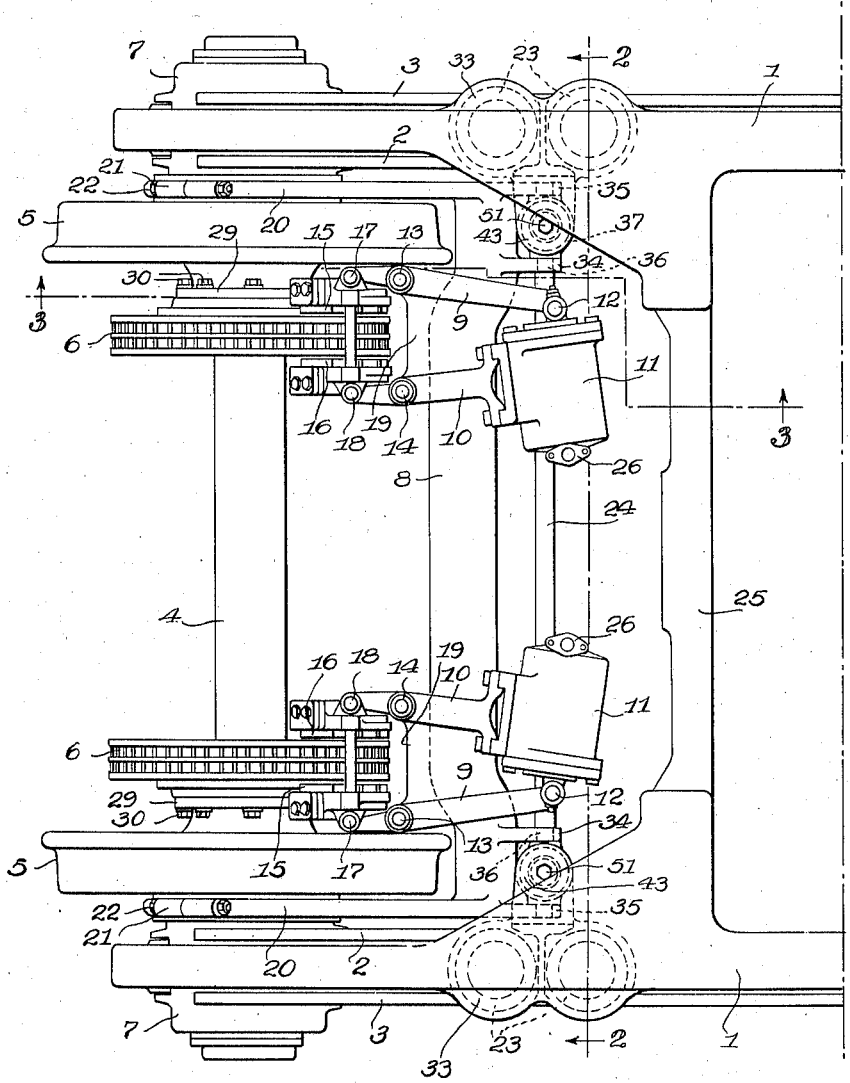
Fig. 1 is a fragmentary plan view showing approximately one-half of a wheel truck, including brake mechanism embodying the invention.

The truck frame 1 is supported resiliently from the equalizer bars 2 and 3 by helical springs 23 interposed between said bars and the side members of the frame 1, suitable supports 31 being mounted on the equalizer bars and having recesses 32 therein to receive and retain the lower ends of the said springs, while corresponding members 33 are provided on the side frames, to receive and retain the upper ends of the springs.

The side frames may be connected by the cross members 25 constituting the transom.

The truck carries the axles 4, having thereon the wheels 5 and brake rings 6, said rings being secured to the hub flanges 29 by bolts or the like 30. The ends of each axle 4 are mounted in journal boxes 7, mounted in pedestals 27 and 28, carried by the truck frame. The equalizer bars 2 and 3 have their end portions upwardly offset and resting on the journal boxes 7 (see Figs. 1 and 3). Mounted upon the inner end of each journal box 7, so as to pivot about the axis of the axle 4, is the corresponding supporting arm 20 forming part of the C-frame or brake yoke.

Said arms 20 are rigidly attached to the opposite ends of the tubular cross piece 8 which carries part of the brake mechanisms, each of which is here shown as comprising a cylinder 11 mounted on a lever 10 pivotally held at 14 on a flange 19 of the cross member 8, the short forward arm of said lever 10 being pivotally attached at 18 to a brake shoe 16. Said mechanism further comprises another lever 9 pivotally mounted at 13, and pivotally attached at 12 to the piston rod of the cylinder 11, the short arm of lever 9 being pivotally secured at 17 to a brake shoe 15, the said brake shoes being placed on opposite sides of the brake ring 6, so that when the piston is forced out of the cylinder by supplying pressure fluid through the port 26, the brake shoes will be forced against the opposite faces of the ring 6.

Each arm 20 has a semi-circular end engaging around the journal box 7 and cooperating with a strap 21 to complete the circle, said strap being secured to the end of the arm 20 in any suitable way, as by the bolts 22.

As so far described, the brake yoke or C-frame comprising the arms 20 and the cross member 8 could rotate freely about the journal boxes. In order to prevent such rotation, except for a necessary small range of the same, rearwardly extending flanges 34 and 35 may be provided at each end of the cross piece 8, as best shown in Fig. 4, and a pin 36 inserted through corresponding alined bores in said flanges, to support pivotally a block or disk 37.

The lower surface of this block may have therein a recess 38, within which is seated the upper end of a relatively weak helical spring 39, the lower end of which is received and retained in a corresponding recess 40, formed in an inward extension 41 of the support 31, which latter has its base 31a mounted between the equalizer bars 2 and 3. This extension 41 terminates in a fork having the lower arm 42 in which the recess 40 is formed, and the upper arm 43, a strengthening rib 44 arranged between springs 23 (see Fig. 1) preferably being provided to stiffen the extension 41.

The lower arm 42 may carry a yieldable bumper 45, preferably consisting of rubber, vulcanized to a nut 46 which is secured in position by means of the cap screw 47 and lock washer 48, the buffer 45 being of such length that the lower surface of the disk 37 will strike the top thereof shortly before the spring 39 is fully compressed. Another bumper or buffer 49, also consisting of a rubber portion vulcanized to a nut 50, cooperates with the upper surface of the disk 37 and is secured in the arm 43 by the cap screw 51 and lock washer 52.

The two corresponding supports 31 on opposite sides of the truck frame, carried by the equalizer bars 2 and 3, are suitably braced or strengthened by means of a bar or rod 24 extending across the frame. It will be seen that a pin or bolt 57, having a clevis head 58, passes through each pair of equalizer bars 2, 3, and the support 31, a nut 54 and lock washer 55 being provided to secure these parts together firmly.

A cooperating nut 56 having an eyelet at its end is threaded on each end of the rod 24, and locked in place by the locknut 53. A pin 59 passes through the clevis and the eyelet in the nut 56 to hold the said equalizer bars from tilting or twisting, the pins 59 providing sufficient pivotal action to prevent binding, and the nuts 56 permitting adjustment of the effective length of the rod 24.

It may be remarked that the supports 31 serve the double purpose of carrying the springs 23 on the one hand, and the springs 39 and buffers 45 and 49 on the other hand. By carrying these latter on the equalizer bars instead of mounting them on the frame 1, the advantage is secured that the springs 39 obviously are much less likely to be disturbed by vertical motion of their supports.

The operation of the invention is as follows:

When it is desired to apply the brakes, compressed air or the like is admitted to the cylinders 11, whereupon the piston and cylinder in each instance will move in opposite directions, separating the rear arms of the levers 9 and 10, and thereby causing the short forward arms to bring the brake shoes 15 ond 16 against the respective sides of the brake rings 6.

When the brake shoes are thus engaged with the rings, the momentum of the vehicle will cause the brake yoke 8 to pivot about the axis of the axle 4 in one direction or the other, depending upon the direction in which the vehicle is traveling, and such pivotal motion will therefore proceed until the disks 37 carried by the brake yoke have been forced against one or the other of the rubber buffers 45 and 49. The spring 39 normally will support the disk 37 out of contact with either of said bumpers, so that they will abut against the disk 37 only while the brakes are actually applied.

The axes of the springs 39 are located in the vertical transverse plane which passes through the center of percussion of the C-frame or yoke. These springs are relatively weak or low rate, since they need carry only about 350 to 375 pounds each, in the example herein disclosed. By reason of the positioning of these springs in vertical alignment with the center of percussion of the yoke, the resultant of the inertia movements of the yoke, produced by shocks and jarring in service, will act in line with said springs, and be absorbed and cushioned thereby without jarring the pivotal connections of the yoke to the journal boxes.

The rubber buffers 45 and 49, when sufficiently compressed, will act as rigid solids, which happens only when the brakes are applied, the torque being then transmitted through the equalizer bars to the axles.

We claim:

1. A brake mechanism comprising a rotary element, means frictionally engageable therewith, a yoke supporting said means, said yoke being pivotally supported about an axis substantially coaxial with the axis of the rotary element, and yieldable supporting means cooperating with said yoke to limit the rotation of the yoke about its pivot, and acting on said yoke substantially in alinement with the center of percussion thereof.

2. A brake mechanism comprising a rotatable brake ring, a brake shoe cooperating therewith, means for actuating said brake shoe, a yoke supporting said actuating means, said yoke being pivotally supported about an axis substantially coaxial with the axis of the brake ring, and yieldable supporting means cooperating with said yoke to limit the rotation of the yoke about its pivot, and acting on said yoke substantially in alinement with the center of percussion thereof.

3. A brake mechanism comprising a rotatable brake ring, a brake shoe cooperating therewith, means for actuating said brake shoe, a yoke supporting said actuating means, said yoke being pivotally supported about an axis substantially coaxial with the axis of the brake ring, and yieldable supporting means cooperating with said yoke to limit the rotation of the yoke about said axis, and acting on said yoke substantially in alinement with the center of percussion thereof.

4. A brake mechanism comprising a rotatable brake member, a brake shoe cooperating therewith, means for actuating said brake shoe, a yoke supporting said actuating means, said yoke being pivotally supported about an axis substantially in alinement coaxial with the axis of the brake member, and duplex yieldable supporting means cooperating with said yoke to limit the rotation of the yoke about said axis, and acting on said yoke substantially in alinement with the center of percussion thereof, said duplex means comprising two independent yieldable devices of materially different degrees of stiffness, engageable successively.

5. A brake mechanism comprising a rotary element, means frictionally engageable therewith, a yoke supporting said means, said yoke being pivotally supported about an axis substantially coaxial with the axis of the rotary element, and duplex supporting means comprising a yieldable device normally in contact with the yoke and a second yieldable device arranged to abut against said yoke when the brake is applied, to limit the rotation of the yoke about its pivot, said first-named yieldable device acting on said yoke substantially in alinement with the center of percussion thereof.

6. Means for controlling the motion of a pivotally mounted brake yoke about its axis, comprising a relatively weak resilient member normally continually supporting said yoke at a point remote from said axis, and a buffer of yieldable material having a relatively great resistance compared to said resilient member, and engageable by said yoke upon substantial pivotal motion thereof due to brake application.

7. Means for controlling the motion of a pivotally mounted brake yoke about its axis, comprising a relatively weak spring normally continually supporting said yoke at a point remote from said axis, and substantially in line with the center of percussion of the yoke, and a buffer of yieldable material having a relatively great resistance compared to said spring, and engageable by said yoke upon substantial pivotal motion thereof due to brake application.

8. Means for controlling the motion of a pivotally mounted brake yoke about its axis, comprising a pair of relatively weak resilient members normally continually supporting said yoke at spaced points adjacent opposite ends of the yoke and remote from said axis, and a buffer of yieldable material having a relatively great resistance compared to said resilient member, and engageable by said yoke upon substantial pivotal motion thereof due to brake application.

9. Means for controlling the motion of a pivotally mounted brake yoke about its axis, comprising a pair of relatively weak resilient members normally continually supporting said yoke at spaced points adjacent opposite ends of the yoke and remote from said axis, said yoke normally lying substantially in a horizontal plane and said spaced points lying substantially in a vertical plane parallel to the axis and passing through the center of percussion of the yoke, and a buffer of yieldable material having a relatively great resistance compared to said resilient member, and engageable by said yoke upon substantial pivotal motion thereof.

10. The combination of a railway truck having a wheel and axle assembly and equalizer bars supported thereby, and a brake mechanism therefor, said brake mechanism comprising a rotary brake element, a non-rotary brake element for cooperation therewith, a support for said last-named element, said support being pivotally mounted about an axis substantially coaxial with the axis of said rotary element, and cushioning means for said support remote from the axis of said rotary element and between the support and the equalizer bars.

11. The combination of a railway truck having a frame, a wheel and axle assembly and equalizer bars supported thereby, and a brake mechanism therefor, said brake mechanism comprising a rotary brake element, a non-rotary brake element for cooperation therewith, a yoke supporting said last-named element, said yoke being pivotally mounted about an axis substantially coaxial with the axis of said rotary element, spring seating abutments associated with said equalizer bars, springs engaging said abutments and supporting said truck frame from the equalizer bars, said abutments having lateral extensions, and springs supporting said yoke from said lateral extensions.

12. The combination of a railway truck having a wheel and axle assembly and equalizer bars at the opposite sides of the truck supported by said assembly and a brake mechanism therefor, said brake mechanism comprising a rotary brake element, a non-rotary brake element for cooperation therewith, a yoke supporting said last-named element, said yoke being pivotally mounted about an axis substantially coaxial with the axis of said rotary element, means yieldably supporting said yoke from the equalizer bars, and means transversely connecting the equalizer bars on the opposite sides of the truck in the region of said yieldable supporting means.

13. The combination of a railway truck having a wheel and axle assembly and equalizer bars supported thereby, and a brake mechanism therefor, said brake mechanism comprising rotary brake elements one adjacent to and rotatable with each wheel of said wheel and axle assembly, a non-rotary brake element for cooperation with each rotary brake element and actuating means therefor including a brake cylinder, a rigid yoke support for said non-rotary brake elements and their actuating means, said yoke support being pivotally carried, at the opposite sides of the truck, from the wheel and axle assembly, and cushioning means for said support remote from the axis of said assembly and between said support and the equalizer bars.

CAROLUS L. EKSERGIAN.
JOSEPH H. COOMBES.